Dec. 13, 1966      V. F. MICHAEL      3,291,881
THREADED PIPE CONSTRUCTION METHOD
Filed Oct. 12, 1962      2 Sheets-Sheet 1
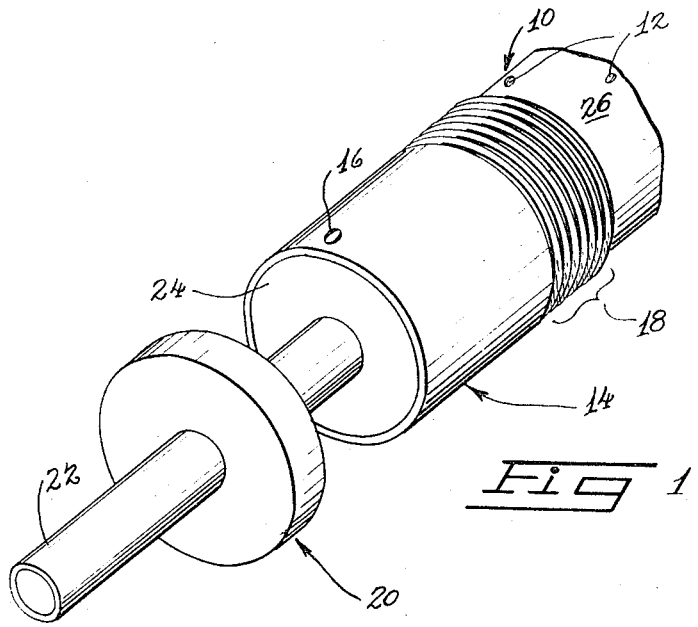
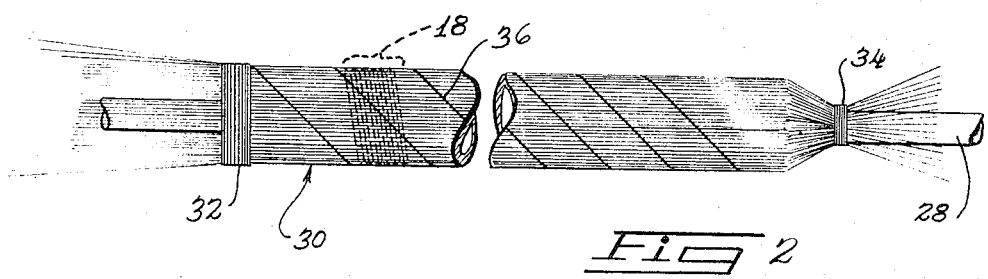
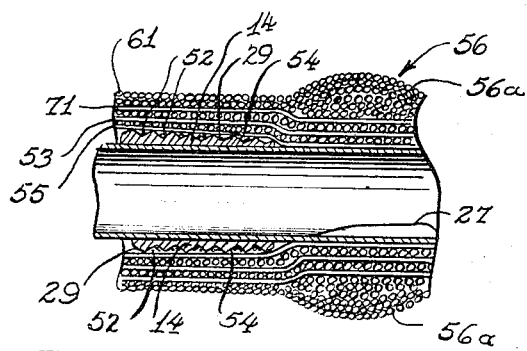
INVENTOR.
Vesta F. Michael
BY
Olson, Mecklenburger, von Holst,
Pendleton & Neuman Attys Dec. 13, 1966 V. F. MICHAEL 3,291,881

THREADED PIPE CONSTRUCTION METHOD

Filed Oct. 12, 1962 2 Sheets-Sheet 2

INVENTOR.
Vesta F. Michael
BY
Olson, Mecklenburger, von Holst,
Pendleton & Neuman Attys United States Patent Office 3,291,881
Patented Dec. 13, 1966

3,291,881
THREADED PIPE CONSTRUCTION METHOD
Vesta F. Michael, Wichita, Kans., assignor to Rock Island Oil & Refining Co., Inc., Wichita, Kans., a corporation of Kansas
Filed Oct. 12, 1962, Ser. No. 230,093
7 Claims. (Cl. 264—266)

This invention relates to glass-reinforced resin pipe, and more particularly pertains to reinforced resin pipe having opposed threaded end portions comprising an internally threaded coupling end and an externally threaded male or "pin" end.

The use of discrete coupling members for joining the threaded adjacent ends of resin or plastic pipe is well known. However, the use of discrete coupling members has certain disadvantages. The chances for leaks are two-fold since two threaded ends are joined by an interposed connector. The time and effort necessary for assembly is appreciable since each and every pipe segment must be threadedly engaged with a coupling. The opposed coupling shoulders have a tendency to catch upon sharp edges and projections if a pipe string is run into wells or other elongate openings. The latter disadvantage may be most serious in sandy formations.

In addition to the above disadvantages of use, there are certain disadvantages of manufacture encountered when resin pipe couplings are made. In the normal course of coupling manufacture the interior of the coupling "shell" is first roughened by a rasp or other equivalent means to permit better bonding to the threads which will be molded thereon. However, difficulty is oftentimes experienced in obtaining desired bonding of the threads to the coupling interior because of the small interval available for concentric alignment of the mold relative to the surrounding coupling shell with resulting thread weakness. If a coupling end could be formed integrally with each resin pipe section, many disadvantages peculiar to a discrete coupling would be eliminated.

This invention relates to providing a glass-reinforced resin pipe having opposed threaded end portions, including a coupling end, which provide joints having tensile strengths fifty percent greater than joints employing similar threaded pipe used in conjunction with discrete coupling members.

It is another object of the invention to provide a novel method for forming a coupling end on a resin pipe which assures the elimination of any entrapped air in the threads formed therein, thereby providing maximum thread strength.

It is another object of this invention to provide apparatus and a novel method for forming external or male threads on the pin end of a resin pipe which assures the absence of entrapped air in the resin forming the threads, as well as ready disengagement between the thread mold and the completed pipe.

It is yet another object of this invention to provide a novel method for formation of a coupling end on a glass-reinforced resin pipe in which the coupling end is formed concomitantly with the pipe, thereby necessitating only a minimum of processing time for the formation of the coupling end alone.

The above and other objects of this invention will become more apparent from the following detailed description when read in the light of the accompanying drawing and appended claims.

In one embodiment of this invention a threaded nipple-like member is snugly received over one end portion of a rotatable mandrel and locked in place thereon. A parting agent such as wax is coated on the mandrel, and a resin release agent is coated over the nipple threads. The prepared mandrel is then placed in a common lathe-type machine and a thickened mixture of a resin, such as epoxy resin thickened with a thixotropic agent, is applied over the nipple threads as the mandrel rotates. A few fine strands of material such as glass roving are wrapped spirally in the nipple or female form threads to release any entrapped air in the resin and assure uniform and complete filling of the threads.

A longitudinal assemblage of glass roving strands is placed under tension and positioned about the periphery of the mandrel. A single roving spiral of widely spaced convolutions is wrapped about the longitudinal strands which have first been saturated with resin to bring the saturated strands into close engagement with the mandrel surface. Alternate layers of longitudinal and helical roving are then applied in a known manner until the desired pipe dimensions are attained.

Following formation of the pipe on the rotatable mandrel, external threads are formed in the pin end or male end of the green uncured pipe oppositely disposed to the pipe coupling end. The male threads are formed by means of a centrally apertured male mold having opposed ends encased in novel caps or jackets of flexible material, such as polyethylene plastic. The threads of the male thread mold are covered with a resin release agent and filled with a thickened resin composition. The thread-filled mold is then fitted over the pipe end oppositely disposed to the coupling end. The thickened resin of the mold bonds with the uncured resin covering of the green pipe. The novel plastic caps are formed so as to retain the thickened resin in the mold threads eliminating any possibility of air entrapment and resulting thread weakness in the finished pipe, as will hereinafter be explained in greater detail.

For a more complete understanding of this invention, reference will now be made to the drawing wherein:

FIGURE 1 is a fragmentary perspective view of a mandrel and associated apparatus elements employed in the formation of a coupling end in a reinforced resin pipe;

FIG. 2 is a fragmentary elevational view illustrating a longitudinal glass roving assemblage disposed about apparatus employed in the formation of a reinforced resin pipe in the initial stages of pipe formation;

FIG. 3 is a fragmentary sectional view illustrating a coupling end of a glass-reinforced resin pipe following formation thereof on a mandrel in assembled relationship with the coupling end thread mold;

Figure 4:
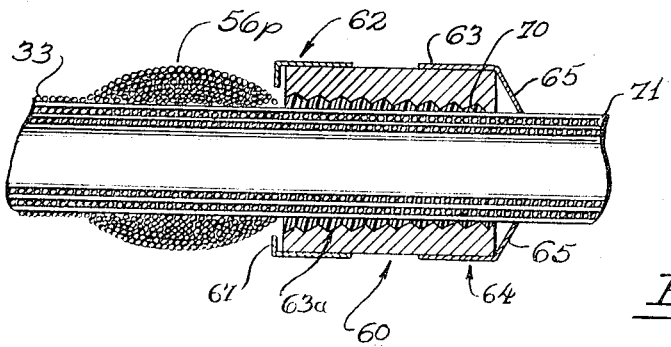
FIG. 4 is a fragmentary sectional view, partly in elevation, illustrating the pin end of a resin pipe in the process of having male threads formed thereon by means of a novel mold construction.

Referring now more particularly to FIG. 1, a rotatable mandrel 10 is therein illustrated having radial apertures 12 formed therein. Secured to one longitudinal end of the mandrel is a nipple-like member 14 secured in fixed position on the mandrel by means of a screw 16 which engages a threaded opening in the nipple and lockingly engages an underlying surface portion of the mandrel 10 by means of the screw terminal end limit. Equivalent means preventing relative movement between the mandrel and nipple may be employed. It will be noted that the locking screw 16 is disposed adjacent the reduced mandrel portion 22 to facilitate subsequent nipple disengagement, as will hereinafter be explained in greater detail. The nipple 14 has a threaded portion 18 disposed innermost; the latter threaded portion comprises a thread mold for a coupling end of a glass-reinforced resin pipe which is to be formed about the mandrel and nipple assembly.

Also illustrated in FIG. 1 is a prestressing ring 20 which is snugly received about the reduced terminal end portion 22 of the mandrel. In the normal course of use, prestressing ring 20 is urged into abutting relationship with shoulder 24 to define an anchor for longitudinal roving strands for purposes hereinafter explained.

The pipe to be made in accordance with the teaching of this invention is of the type disclosed in my United States Patent No. 3,202,560 which issued August 24, 1965. Such pipe comprises a glass-reinforced resin pipe in which alternate layers of longitudinal and helical glass roving are embedded in cured resin, such as epoxy resin. The resulting pipe has high tensile and burst strengths, as well as corrosion resistance and other desirable properties. The ultimate tensile load of a two and one-half inch medium service tubing joint increased from about 30,000 pounds to about 45,000 pounds when the integral coupling constructions of this invention were substituted for discrete coupling members.

Figure 5:
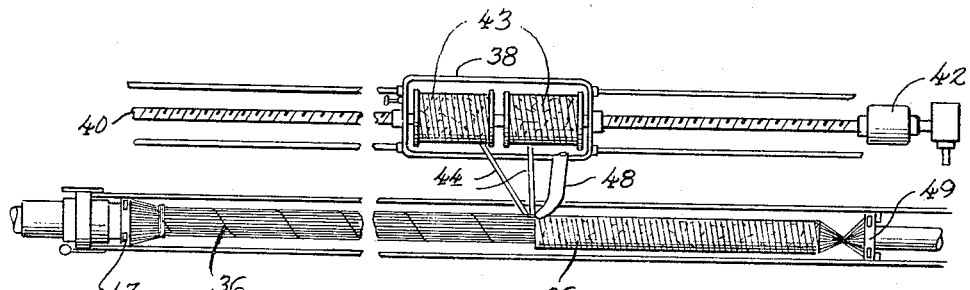
FIG. 5 is a fragmentary top plan view illustrating one form of apparatus which may be employed in the formation of glass-reinforced resin pipe.

Following assembly of the nipple 14 to one end portion of the rotatable mandrel 10 and positioning of the mandrel and nipple assembly together with the prestressing 20 in a common lathe-type apparatus schematically shown in FIG. 5, the exposed pipe-forming surface 26 of the mandrel is coated with a parting layer such as paraffin, in the manner disclosed in my United States Patent No. 3,231,442 which issued January 25, 1966. In the course of pipe formation, the paraffin coating placed about the surface 26 of the mandrel serves to prevent adherence between the formed plastic pipe and the external periphery of the mandrel. After the pipe is formed and the same, in combination with the mandrel, is exposed to a curing temperature, the heat applied for curing purposes expands the mandrel, forcing the wax or other parting material to enter the perforations 12. It is the mandrel expansion which also places the reinforcing roving of the pipe under tensile stresses while the resin of the pipe cures.

Following curing of the pipe the same may be slipped from engagement with the underlying mandrel at which time substantially all of the wax coating initially applied to mandrel surface 26 will lie in the hollow center of the mandrel from which it may be recovered for reuse. In FIG. 3 a mass of wax 27 is illustrated in the internal mandrel passageway following pipe formation.

At the same time that a parting paraffin layer is applied to mandrel surface 26, the threads of the nipple 14 secured to the mandrel are coated with a layer of resin parting agent 29 (see FIG. 3). The agent will assure ready disengagement between the nipple and the resin threads formed thereover following pipe completion. The parting agent may vary with the plastic composition employed for forming the overlying glass-reinforced threads.

Following application of the resin parting agent over the nipple 14, a quantity of resin and hardener therefore (together with a thickening agent if the resin-hardener mixture is too thin for application) is applied about the complete periphery of the nipple threads. The mixture is applied about the threads in sufficient quantity so as to completely fill the same. This thickened mixture may be poured into the nipple threads as the mandrel is rotatably driven.

Epoxy resin reinforced by strands of glass roving which are in parallel and untwisted relationship has been found to comprise an excellent combination for use in the formation of pipe of the type herein described. However, this latter combination is given by way of example only and the apparatus and methods herein disclosed for the formation of threads on opposed end portions of the disclosed pipe may be applicable to other resin compositions employing other means of reinforcement, if any.

The following composition has been found to be extremely effective in formation of the threads molded about form 14 illustrated in FIG. 1: Epoxy resin, 100 parts; resin hardener (triethylene tetramine), 12 parts based on the weight of resin; silica powder (200 mesh), 30 parts per 100 parts by weight of the resin; and a thixotropic agent in the amount of 2 parts per 100 parts by weight of the resin.

Following application of this thickened resinous mixture a few ends of glass roving (see strands 52 in FIG. 3), which may comprise about three to five filaments of glass, are wrapped spirally about the valleys of the threads 18 to assure the dispersion of any air which may have become entrapped in the thickened resinous mixture. The latter glass filaments may be approximately three feet in length and may be wrapped about the resin filled threads while the mandrel and connected parts are rotating. In addition to assisting in removing entrapped air, the filaments impart hoop strength to the threads which resists outwardly directed forces applied to the pipe portion containing the threads.

Following the above-described initial preparation of the mold for the threads to be internally formed on the coupling of the pipes, step are carried out to build up the pipe thickness in the manner disclosed in my United States Patent Nos. 3,202,560 and 3,231,442 by applying alternate layers of longitudinally arranged and spirally wound untwisted glass roving. As has been pointed out in my copending applications, it is desired that the glass filaments be in untwisted relationship. It is also desired that the glass filaments be arranged substantially transversely to the mandrel longitudinal axis in the spiral helices and arranged parallel to the mandrel longitudinal axis in the longitudinal assemblages. As a result, any tensile or bursting forces imparted to the pipe may be reacted to efficiently by the individual filaments of the glass reinforcement. Because of the untwisted relationship of the glass filaments, any force exerted thereon placing the same in tension will not result in any cutting action being exerted between adjacent filaments.

It is preferred that for strength purposes the initial glass filament layer applied to the mandrel surface, including that portion of the mandrel having the threaded form disposed thereon, comprise a longitudinal assemblage or "sock" of glass roving. The glass strands of the latter assemblage being arranged parallel to the longitudinal axis of the mandrel may directly resist any tensile stresses imparted to the pipe along the length thereof. As is explained in my United States Patent No. 3,202,560, it is desired that all glass filaments incorporated in the pipe be bound in the surrounding resin under tension so that when the final cured pipe is put in use these tension forces may be utilized in resisting forces which may be applied to the pipe.

FIG. 2 illustrates a longitudinal assemblage of glass filaments 30 disposed about a mandrel and the female thread form 14, the threads thereof being shown in dotted lines. It will be noted from this latter figure that opposed end portions of the assemblage 30 are locked in place by means of locking helices 32 and 34 wound about a prestressing ring 20 at a left sock end portion and reduced mandrel end portion 28 at a right sock end portion, respectively. In the course of pipe formation the filaments of the longitudinal strand assemblage 30 are placed under tension by means of a hydraulic piston or the like which acts to pull a locking ring (see ring 47 of FIG. 5) to which all of the ends of the glass filaments are secured away from an opposed locking ring (see ring 49 of FIG. 5) in a manner disclosed in my United States Patent No. 3,202,560. Following tensioning of the filaments of assemblage 30, locking helices 32 and 34 are wound about prestressing ring and mandrel portion 28, as illustrated, to firmly secure the ends of the assemblage in place. Since locking rings 47 and 49 must be detached from the mandrel and pipe following pipe formation, locking helices 32 and 34 assure maintenance of the longitudinal filaments under tension while the resin of the green pipe is subsequently cured.

Next, a spiral wrap of glass roving 36 having widely spaced helices is wound about the assemblage so as to bring the same into overlying contact with the underlying coated mandrel surface and nipple surface since locking rings 47 and 49 are of greater diameter than the mandrel portion defining surface 26. Prior to winding roving helix 36 about the longitudinal assemblage, sufficient resin is applied to the assemblage 30 to assure complete resin saturation thereof. Alternate layers of helical and longitudinal glass roving are then applied until a pipe of proper dimensions has been formed. The number of spiral and helical layers varies with the intended use of the pipe and the number of layers shown in the drawings is given by way of illustration only.

FIG. 5 illustrates, in a schematic manner, apparatus also disclosed in my United States Patent Nos. 3,202,560 and 3,231,442, which may be employed for applying helical roving over the longitudinal assemblage 30. In FIG. 5 a platform 38 is reciprocally movable along the length of the adjacent rotating mandrel partially formed pipe assembly by means of rotating screw 40 which is driven by a reversible motor 42. Mounted on the platform 38 are two spools 43 of glass roving which are controlled so as not to rotate until a predetermined torque is applied thereto. Glass roving strands 44 are pulled from spools 43 and helically wound about the rotating mandrel and overlying strand assemblage 30 so as to form a layer 36. Simultaneously with the application of the glass roving 44, a resin-hardener mixture is applied thereto so that the same is saturated upon being formed over the rotating mandrel. Numeral 48 identifies a resin-hardener dispenser adapted to saturate the glass roving being applied in the form of helices to the rotating mandrel.

FIG. 3 illustrates one end portion of a completed pipe formed in accordance with the steps of the above process. In FIG. 3, numeral 52 identifies the glass filaments which are employed for purposes of assuring dispersion of any air which may have been trapped. The threads of the nipple 14 are thus seen in FIG. 3 to be employed as a mold for female threads 54 formed in the completed pipe.

It will also be noted from the sectional view of FIG. 3 that adjacent the coupling end portion of the illustrated pipe is a built-up pipe portion 56 which is larger in diameter than the remaining portion of the pipe by virtue of extra windings 56a of helical glass filaments. It is intended that the built-up portion 56 comprise a portion of the pipe which is engaged by wrenches or other means employed in the course of assembling pipe portions into a line or string. Because of its enlarged size, portion 56 will have desired additional strength with which to resist rough handling imparted thereto. It wi'l also be noted from FIG. 3 that to improve the strength of the coupling end portion of the pipe, additional spiral helices 61 may also be formed about the underlying threaded area thereby improving the "hoop" strength thereof.

It is preferred that the glass layers formed adjacent the male and female threads in the formation of the resin pipe be longitudinal strand assemblages. It is also preferred that the initial glass layer applied in the formation of the entire pipe be longitudinal. By initially applying a longitudinal glass strand assemblage to the mandrel, chances of a glass filament cutting through the internal peripheral surface of the final completed pipe are minimized. Cutting through or filament "pull out" is minimized since the tension exerted on the innermost filaments is exerted in a direction parallel to the longitudinal axis of the pipe and not transversely thereto. Consequently, the disposition of the horizontal glass assemblage at the inermost layer reduces the chance of pull out of any filament through the interior pipe wall, and in addition tends to provide a uniform internal pipe periphery free from any protuberances, such as would more likely occur if a spiral wrap were the initial layer.

The presence of an inwardly directed protuberance on the pipe surface is objectionable when a reciprocating object is disposed in the pipe interior. A pipe may be employed in a pumping operation and have a reciprocating plunger disposed therein. The outwardly directed forces applied to such protuberance in the course of plunger reciprocation would lead to ultimate, if not immediate, destruction of the pipe.

An outer longitudinal strand assemblage 71 in the vicinity of resin threads 54 is desired (see FIG. 3) to afford added shear strength to the threads. Interposed assemblages 53 and 55 also afford shear strength. The longitudinally tensioned strands spaced outwardly from the resin threads tend to dissipate shear stresses which otherwise might deleteriously affect the threads. The outermost glass roving application employed in the course of formation of the pipe pin end is also a longitudinal assemblage to facilitate slidable movement thereover of a male-thread mold 60, more clearly seen in section FIG. 4.

It will also be noted from FIG. 4 that the final roving layer between the upsets 56 and 56p is preferably a spiral layer 33 of overlapping strand helices which serves as a locking layer retaining all underlying strands in place.

Mold 60 is employed in conjunction with opposed plastic caps 62 and 64. It is the function of the mold 60 and associated caps 62 and 64 to assist in the formation of male threads about the pin portion of the pipe oppositely disposed to the coupling end portion.

Figure 6:
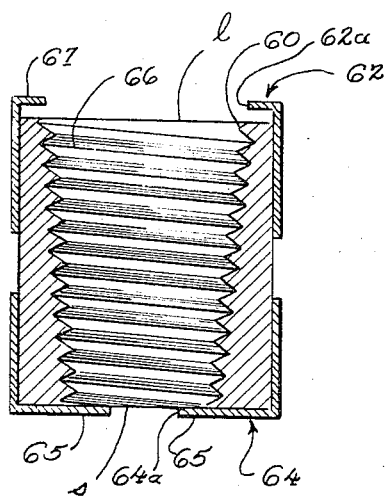
FIG. 6 is a longitudinal sectional view illustrating the mold illustrated in FIG. 4 and the opposed cap members secured to opposite end portions thereof prior to engagement with a pipe member.

In the normal course of use of the mold 60, a resin parting agent 63 is applied over the threaded surface 66. A thickened resin composition 70, such as that previously described, which will ultimately form the male threads of the final pipe product, is applied to the threaded surface 66. For a two and one-half inch pipe the diameter of opening 62a in cap 62 is approximately one-sixteenth inch larger than larger mold passageway opening $l$ immediately therebeneath and is spaced about one-eighth inch from the underlying mold. It is seen from FIG. 6 that surface 66 defines a threaded, tapered passageway. Cap 64 disposed in part about the smaller opening $s$ of the mold 60 has an opening 64a disposed therein which is approximately one-fourth inch smaller than the diameter of tubing about which the male threads are to be formed.

Following application of the thickened resin mixture 70 to the threaded surface 66 of the mold 60, the die and cap assembly, together with the resin, is pushed over the pin end of the tubing so as to obtain a position such as is illustrated in FIG. 4. It will be noted from FIG. 4 that the outermost roving layer adjacent the threads formed from the resinous composition 70 is composed of longitudinal strands 71 to both facilitate slidable movement thereover of the mold and also afford shear strength to the threads formed thereover. In the course of obtaining the position of FIG. 4, the resin disposed about the outer periphery of the formed, but uncured, pipe has not yet set and securely bonds with the thickened, but plastic, resin mixture applied to the mold surface 66. Consequently, as the mold and tube assembly is moved to the left, as illustrated in FIG. 4, cap portion 65 defining an opening of lesser diameter than the outer diameter of the pipe pin end portion is coned outwardly away from the opposed cap 62.

Portion 65 of cap 64 functions as a wiper forcing the resin on the pipe and initially coated on the mold into the mold threaded portions thereby displacing any air between the mold and the pipe, in which interval the resin threads are formed. Portion 67 of cap 62 allows excess resin to emerge from between the mold and pipe during mold movement and in the final position may assist in centering the mold by engaging built-up pipe portion 56a. Portion 67 also functions as a reservoir from which resin may be fed back between the mold and pipe should any voids be disposed therein.

Figure 7:
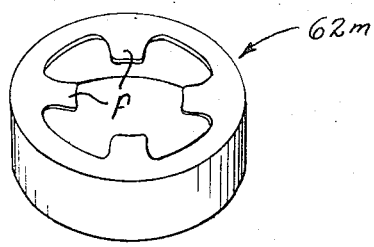
FIG. 7 is a perspective view of a modified cap for use with a male-thread mold.

The cap portion disposed about the larger opening *l* of the mold threaded passageway may have inwardly projecting centering fingers *f*, as indicated in modified cap 62*m* illustrated in FIG. 7. The fingers *f* may lie on a periphery of precisely the same diameter as the pipe end portion encompassed thereby. Thus, the fingers *f* will not flex in the direction of the threads being formed and interfere with proper thread formation in the course of centering the mold relative to the surrounded pipe end. The number of fingers *f* need only be sufficient to center the cap 62*m* and provide plenty of space therebetween through which excess resin may escape if necessary. A desired reservoir is still available utilizing the cap of FIG. 7.

Following application of the mold and cap construction of FIG. 5, the resulting assembly, including the mandrel, the pipe formed thereon, the coupling end mold and the pin end mold, is rotatably mounted on a curing table. The pipe is rotated to insure uniformity of resin disposition about the pipe periphery and subjected to a curing temperature during the course of which the resin component of the formed pipe is cured and the glass filaments further stressed by mandrel expansion. Following curing of the pipe, the prestressing ring 20 may be separated from the mandrel and pipe assembly by cutting the pipe approximately in the plane of the mandrel shoulder 24.

In order to minimize wastage and facilitate final pipe-apparatus separation, the spiral windings should not be formed any significant distance past the terminal thread of nipple 14 disposed adjacent the nipple unthreaded portion. Following removal of the ring 20 from the mandrel, the thin pipe portion covering the screw 16 is peeled back, allowing the fastener to be loosened. The nipple is then unscrewed from the pipe.

It is seen, therefore, from the foregoing that a novel method and apparatus has been disclosed for the formation of a glass-reinforced resin pipe having coupling and pin ends, dispensing with the need for any discrete coupling member.

The provided methods and apparatus for forming threads assure maximum thread strength and require a minimum of processing time. The various threads and molds therefore illustrated embody a taper corresponding to tapers normally found in threaded devices.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. A method for forming male threads on the pin end of an elongate pipe member having an uncured outermost resin surface, comprising the steps of longitudinally moving a centrally apertured threaded mold having internal thread-forming portions filled with a hardenable thread-forming substance inwardly over the end portion of the elongate pipe member about which male threads are to be formed, forcing uncured resin of the pipe surface into the interval between the mold and the pipe at the end of the mold disposed toward the adjacent pipe distal end limit so as to provide fluid pressure to the hardenable thread-forming substance filling the mold thread-forming portions whereby air entrapment between said mold and pipe pin end is avoided, and removing said mold from said elongate pipe member.

2. A method for forming male threads on the end of an elongate member comprising, urging a centrally apertured male thread-forming mold having thread-forming portions defining the central aperture endwise over one end of the elongate member with the thread-forming portions thereof filled with a hardenable thread-forming substance, concomitantly exerting an endwise pressure on the hardenable thread-forming substance forcing the same to proceed in a direction away from said one end whereby any air entrapped between the mold and pipe is forcibly removed by the thread-forming substance and released at the forward end of said thread-forming mold; and removing the mold from said one end of said elongate member.

3. A method for forming threads composed of a hardenable resin by means of a thread mold having a longitudinal passageway, the inner peripheral surface of which comprises a thread form, on an exterior surface portion of an elongated member adapted to be bonded to said hardenable resin; said elongate member exterior surface portion having an outer uncured resin surface layer disposed thereon; comprising the steps of moving the mold endwise over one end portion of the elongate member after first filling the thread form peripheral surface with a plastic coating of said hardenable resin, concomitantly forcing portions of the outer uncured resin surface layer into the elongate member-thread form interval so as to displace substantially all the air therebetween, allowing the hardenable resin and uncured resin surface layer portions disposed within the thread mold to harden, and removing said mold from said one end portion of said elongate member.

4. A method for forming threads composed of a hardenable resin by means of a thread mold having a longitudinal passageway, the inner peripheral surface of which comprises a thread form, on an exterior surface portion of an elongate member adapted to be bonded to said hardenable resin, comprising the steps of moving the thread mold endwise over one end portion of the elongate member, concomitantly forcing uncured plastic resin into the elongate member-thread form interval so as to assure the absence of substantially all the air entrapped therebetween, allowing said resin to harden over the surface portion of said elongate member on which threads are to be formed, and removing said mold from said one end portion of said elongate member.

5. A mold for forming male threads on a pipe end or the like having an uncured resin surface thereon, said mold having a tapered central passageway, the periphery of said passageway defining a thread form for the male threads to be formed by said mold; cap means disposed about the mold larger opening having a peripheral ring portion spaced from said mold passageway larger end in concentric relationship therewith spaced from the mold by means of a connecting wall portion so as to define an open ended reservoir communicating with said mold passageway, the internal diameter of said ring being greater than that of said mold larger opening.

6. A mold assembly for forming external threads on a peripheral surface portion of a pipe or the like, comprising a mold having a tapered longitudinal passageway, the peripheral surface of which defines a thread form, said mold being adapted to be applicable endwise by means of said passageway with the larger passageway end innermost over a pipe on which threads are to be formed, first resilient cap means disposed over the smaller passageway opening and having a central opening of slightly less diameter than that of the pipe over which said mold is to be disposed whereby said first cap means may resiliently engage the pipe periphery and slidably move thereover in the course of said mold endwise movement, and second cap means disposed over the larger passageway opening having an annular portion defining a central opening of slightly greater diameter than that of the pipe over which said mold is to be disposed, the second means annular portion center being in axial alignment with said mold passageway, said second cap means having a cylindrical portion engaging an external peripheral portion of said mold at one end portion and integrally formed with the annular portion outer periphery at the opposed end limit whereby said annular portion is maintained in spaced relationship with the larger end of said mold passageway.

7. The assembly of claim 6 in which peripheral projections are connected to the inner periphery of said second cap means for purposes of engaging the pipe member over which said mold assembly is to be disposed and rendering said second cap means in concentric arrangement relative thereto.

References Cited by the Examiner

UNITED STATES PATENTS

| | | | |
|---|---|---|---|
| Re. 25,560 | 4/1964 | Gifford | 262—264 X |
| 1,365,014 | 1/1921 | Zwicker | 249—59 |
| 1,838,417 | 12/1931 | Le May | 24—59 X |
| 1,859,317 | 5/1932 | Sponsel | 264—279 |
| 2,100,985 | 11/1937 | Smally | 18—34 |
| 2,461,863 | 2/1949 | Zeeb | 285—390 |
| 2,561,351 | 7/1951 | Fentress | 264—262 X |
| 2,904,845 | 9/1959 | Sperry | 264—262 X |
| 2,918,104 | 12/1959 | Scott et al. | 156—180 |
| 2,925,097 | 2/1960 | Duesterberg | 285—390 |
| 2,943,967 | 7/1960 | Simon | 264—271 X |
| 2,948,649 | 8/1960 | Pancherz | 156—180 |
| 2,968,840 | 1/1961 | Morse | 264—274 X |

ROBERT F. WHITE, *Primary Examiner.*

EARL M. BERGERT, *Examiner.*

R. J. CARLSON, L. S. SQUIRES, *Assistant Examiners.*